March 2, 1937.  E. FISCHER  2,072,712
COMMUNICATION CABLE
Filed Nov. 23, 1933
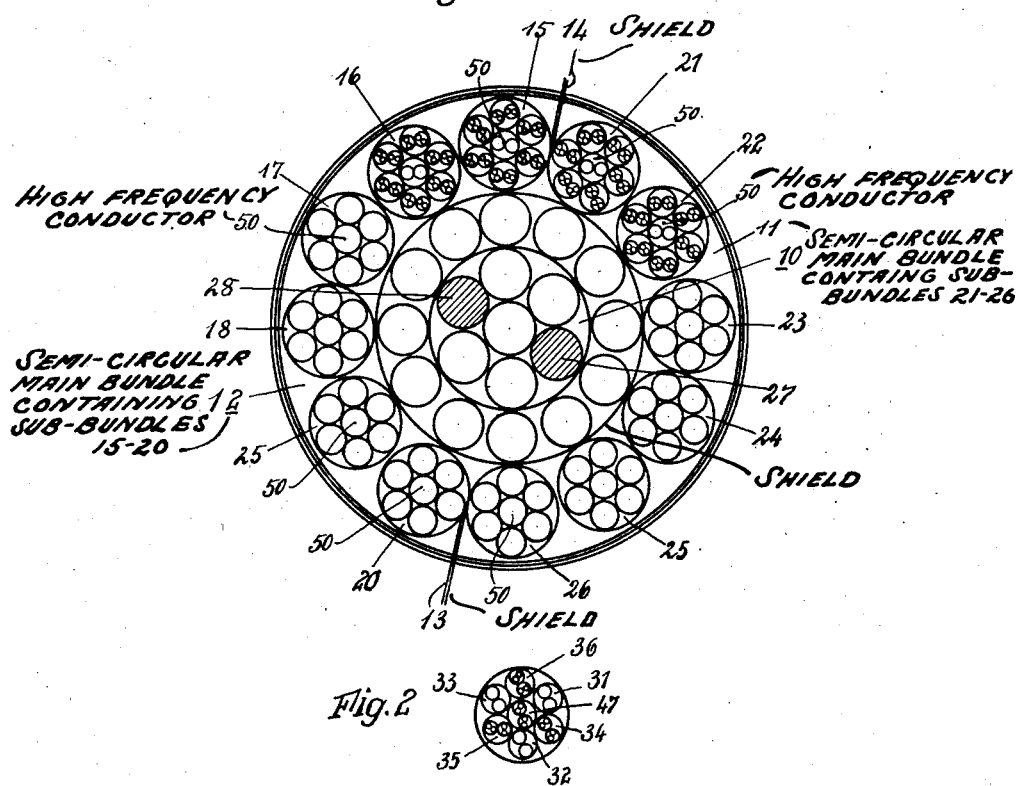
Inventor:
Ernst Fischer
by Knight Bros.
his att'ys.

Patented Mar. 2, 1937

2,072,712

UNITED STATES PATENT OFFICE 2,072,712

COMMUNICATION CABLE

Ernst Fischer, Berlin-Lichterfelde, Germany, assignor to Siemens & Halske, Aktiengesellschaft, Siemensstadt, near Berlin, Germany, a corporation of Germany Application November 23, 1933, Serial No. 699,330
In Germany July 5, 1933

3 Claims. (Cl. 173—81)

The present invention relates to communication cables and communication cable systems for the transmission of low frequency and high frequency currents. This type of cable contains stranded elements, specifically employed for low frequency transmission as well as elements employed specifically for high frequency transmission, particularly for the multiplex carrier frequency transmission. Such a combination is of advantage if it is desired, for instance, to arrange the very far distance communication conductors, which are used for international service, and for interconnecting continents (as distinguished from conductors used for intercity domestic service, ordinarily termed "long distance service"), in the same long distance communication cable employed otherwise substantially for low frequency transmission. As is well known, in international communication cables high speed of transmission is employed in order that the duration of transmission for a conversation remains below a given value. Such far distance communication cables are, as a rule, inductively loaded to a slighter degree than other cables. Consequently, they lend themselves to the simultaneous transmission of a number of carrier frequency bands, i. e., to the so-called multiplex carrier frequency transmission.

It has already been proposed in long distance cables manufactured in the customary way, and in which the strand layers are alternately twisted to the left and to the right, to arrange within the strand layers alternately pairs and quads, whereby the pairs are used for carrier frequency transmission and the quads for low frequency transmission. In this manner the pairs are separated by the interposed quads and thus a high cross-talk damping between the pairs is attained in the carrier frequency transmission. In such a cable operated in four-circuit or phantom circuit fashion it is difficult to attain a sufficiently great cross-talk damping between the conductors which are used for the opposite speaking directions. If in this case the conductors for one speaking direction are located in one annual layer of strands and the conductors for the other speaking direction in another annular, superposed or underlying strand layer, these conductors are brought close to one another at each completed turn of the twist. At these points cross-talk is induced between the conductors used for the opposite speaking directions. Further, in such prior art arrangements, no attention has been paid to the fact that the high frequency currents flowing through the carrier frequency conductors are liable to produce detrimental eddy currents in the lead sheath of the cable. This is particularly the case when the carrier frequency conductors are located in the vicinity of the lead sheath, i. e., when they are located in the outermost layer of conductors.

A particularly favorable interference-free arrangement of the high frequency conductors, for instance of far distance transmission conductors operated in four-wire connection, may be obtained by building the entire communication cable of two or more adjacently located conductor bundles, and by distributing the high frequency communication wires over these conductor bundles or over subbundles in such a manner that the far-end cross-talk is prevented between them as far as possible. By a conductor "bundle" as distinguished from a "layer" I refer to an entity or group of conductors, arranged in one or several layers by themselves, which group always remains separate as a group, instead of being co-extensive with other groups, so that at no time a conductor out of a given group enters the space encompassed by, or comes into the vicinity or inductive range of the conductors of another group. This arrangement is, therefore, distinguished in this respect essentially from a cable in which different groups of conductors are disposed in concentric layers, one group surrounding completely the layer containing another group, or being surrounded completely by the other group. The aforementioned object may be attained by spacing the high frequency communication conductors as far as possible apart from one another within a bundle, so that they are always separated by interspersed conductors for low frequency transmission, by which those high frequency conductors which are located in the outermost layer near the lead sheath, are also shielded from the lead sheath. In case a cable is subdivided into a number of subbundles, it is preferable to distribute the high frequency communication conductors as uniformly as possible over the subbundles, and to arrange them preferably symmetrically within these bundles and to maintain also in this case the greatest possible distance between the high frequency conductors. If each subbundle contains only one high frequency conductor, the latter is arranged in the bundle as centrally as possible.

By connecting the far distance high frequency communication conductors to form transmission circuits, each of which includes both speaking directions, it is of advantage for cables designed according to the invention to so connect the several high frequency conductors appertaining to different speaking directions, that the conductors between which the cross-talk interference is greatest are joined into a phantom circuit. In this case, the slightly perceptible cross-talk is only effective as echo attenuation within the phantom circuit, which generally occurs in circuits which are closest together.

The object of the invention may be accomplished in the manner shown in the accompanying drawing, in which Fig. 1 discloses in cross-section a cable whose conductors are divided into two main bundles according to the speaking directions and each main bundle is sub-divided into a plurality of individual sub-bundles, and Fig. 2 discloses a modification, showing three far distance high frequency conductors arranged symmetrically in a subbundle of cable conductors.

Referring to Fig. 1, around a neutral cable core 10 two semi-circular main bundles 11 and 12 are arranged, each corresponding to a speaking direction, these bundles contacting at points 13 and 14. Each of these semi-circular bundles contains a plurality of subbundles, for instance six subbundles 15 to 20 and 21 to 26 respectively. Each of these subbundles in turn contains one far distance high frequency communication conductor 50 which may be, for instance as shown, arranged centrally in each subbundle. If the high frequency communication conductors in the sub-bundles 15 and 21 and in a corresponding manner the appertaining conductors in the other sub-bundles, for instance 20 and 26, are connected to form a transmission circuit, the cross-talk between the high frequency communication conductors contained in the sub-bundles 15 and 21 is effective only as echo attenuation. This advantage is present for all carrier frequency bands transmitted over the high frequency communication conductors connected with each other.

The design of the central cable core 10 disclosed in Fig. 1 has nothing to do with the invention itself and may be of any suitable type. The cable core consists in the present case of two layers of stranded elements, for instance, multiple twin quads, which surround a central stranded element. Two stranded elements in the first layer constitute two special speaking circuits 27 and 28. Between the adjacent main bundle ends of the two speaking directions, for instance, at the points 13 and 14 as well as between the central cable core 10 and the sub-bundles 15 to 26 surrounding the latter, if desired, well-known electromagnetic and/or electrostatic shields, not shown here, may be arranged.

Instead of arranging in each of the sub-bundles 15 to 26 only one high frequency conductor as shown in Fig. 1, a plurality of such conductors may be provided in each sub-bundle as is shown in Fig. 2 of the drawing. The high frequency communication conductors 31, 32 and 33 are here separated by the stranded conductors 34, 35, 36 and 37 belonging to other phantom circuits. Generally speaking, the same feature prevails as in Fig. 1, namely that each high frequency conductor is arranged in the main bundles so that it is separated from similar conductors in the bundles by the low frequency conductors contained in the bundles.

Instead of communication conductors for far distance and high frequency operation, any other kind of communication conductors, such as are, for instance, employed for broadcasting and similar purposes, may be inserted in order to take advantage of the present invention. The cables according to the invention may be loaded in any suitable manner or may also not be loaded.

I claim:—

1. Long distance cable for the transmission of low and high frequency currents in four-wire circuit connection, said cable containing a plurality of adjacently located main conductor bundles including high and low frequency conductors, of which bundles at least one contains the conductors of one communication direction and at least one other the conductors of the opposite communication direction, said main conductor bundles being divided each into a plurality of sub-bundles, each of said sub-bundles containing a desired number of conductors for the high frequency currents arranged in the sub-bundle symmetrically with respect to the low frequency current conductors, contained in the sub-bundle, so that a high frequency conductor in a sub-bundle has only low frequency conductors located adjacent to it.

2. Long distance cable for the transmission of low and high frequency currents in four-wire circuit connection, said cable containing a plurality of adjacently located main conductor bundles including high and low frequency conductors, of which bundles at least one contains the conductors of one communication direction and at least one other the conductors of the opposite communication direction, each main conductor bundle which contains high frequency conductors, being divided into a plurality of cylindrically shaped sub-bundles, each of said sub-bundles containing one centrally located high frequency current conductor and a plurality of low frequency current conductors surrounding said central conductor.

3. Long distance cable for the transmission of low and high frequency currents in four-wire circuit connection, said cable containing a plurality of adjacently located main conductor bundles including high and low frequency conductors, of which bundles at least one contains the conductors of one communication direction and at least one other the conductors of the opposite communication direction, each main conductor bundle which contains high frequency conductors, being divided into a plurality of cylindrically shaped sub-bundles, each of said sub-bundles containing a central low frequency conductor and alternately arranged high and low frequency conductors surrounding said central conductor.

ERNST FISCHER.